June 23, 1964     A. T. POMANEK     3,138,654
MOVABLE ELECTRICAL BOX
Filed Oct. 20, 1960
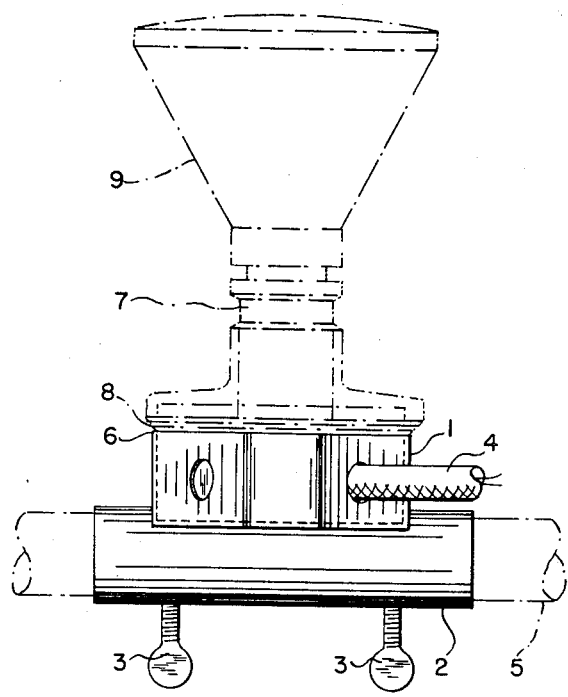
FIG. I
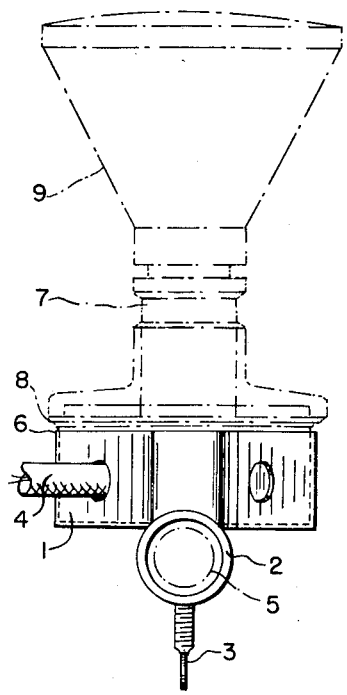
FIG. 2
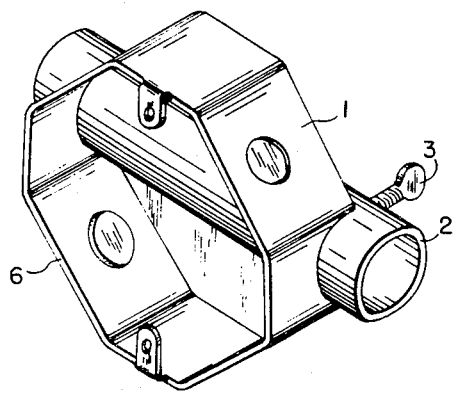
FIG. 3

3,138,654
MOVABLE ELECTRICAL BOX
Adam T. Pomanek, 8 Cannon Road, Old Bridge, N.J.
Filed Oct. 20, 1960, Ser. No. 63,933
1 Claim. (Cl. 174—61)

The present invention relates to a movable electrical outlet box. More particularly the present invention relates to an electrical outlet box with a sleeve. The purpose of the sleeve is to make the electrical outlet box movable on a rod, pipe, or wire rope.

The outlet box referred to is actually one individual unit with a sleeve. The outlet box referred to has no openings or accessibility between it and the sleeve. The outlet box and sleeve are not detachable from each other. An object of the present invention is to provide a movable outlet box for lighting. A further object is to provide a movable outlet box which can be moved to various positions when a rod, pipe, or wire rope is inserted into a sleeve of the movable outlet box. A further object is to provide an improved movable outlet box which can be rotated clockwise or counter clockwise completely around an object supporting it, or moved to any position desired.

A further object is to provide a movable outlet box with sleeve which is cheap to manufacture, sturdy, convenient to use, and which in certain of its aspects provides efficient means for supporting a movable electrical outlet box. The outlet box itself can contain electrical lighting or receptacles. Outlet box is made movable by loosening thumb screws. Further objects will appear as the description proceeds. Referring to the drawing, FIGURE 1 is a top view showing the movable outlet box of the invention with an electrical lamp and fixture therefor shown in phantom;

FIGURE 2 is a side view of the movable outlet box; and,

FIGURE 3 is an isometric view of the movable outlet box.

FIGURES 1, 2 and 3 show the details of construction of the movable outlet box of the invention. This includes an electrical outlet box 1 which may have a conventional appearance such as being octagonal in shape with octagonal side walls joined to a bottom wall. A tubular sleeve 2 extends diametrically across the box 1 and is disposed in a recess cut in the bottom wall and side walls of the box 1. This tubular sleeve 2 is fixedly secured in any desired manner to the box 1 such as by spot welding and substantially closes the outlet box 1 at the bottom wall and also establishes that there is no communication between the outlet box 1 and the interior of the tubular sleeve 2. The ends of the sleeve 2 extend beyond the ends of the box 1.

Two thumb screws 3 are provided in spaced threaded apertures in the tubular sleeve 2 on the wall thereof opposite the bottom wall of the box 1. These thumb screws may be tightened against a rod or pipe or like support 5 which is received within the sleeve 2. By loosening the thumb screws 3, the entire movable outlet box may be moved along the length of the support 5 and this box 1 may be adjustably fastened at any place along the length of the support 5 and in any position around the periphery of this support 5.

The movable outlet box has an open front face which is adapted to receive an electrical outlet 7, in this case shown as a porcelain electrical lamp fixture. A gasket 8 may be used between the fixture 7 and the rim 6 of the outlet box 1 in order to prevent breakage of the porcelain fixture 7. This fixture 7 may conveniently hold an electrical lamp 9 which may be adjusted by the thumb screws 3 to shine in any desired direction. The side wall of the outlet box 1 has at least one knockout through which electrical cable 4 containing conductors may pass to provide electrical connection to the electrical outlet or lamp fixture 7.

FIGURE 2 shows a side view of movable electrical outlet box with hollow sleeve. The sleeve can accommodate wire rope (cable), pipe, rod or bar for its basic support. FIGURE 3 shows an isometric view of the movable electrical box and indicates that the sleeve 2 and outlet box 1 are one single unit. The outlet box and sleeve are not separated from each other by any means.

I claim:

A movable outlet box for use with a cable, pipe, rod or like support comprising, in combination, a metal box having a bottom wall and side wall means connected thereto, a partially cylindrical recess in said bottom wall and side wall means extending diametrically of said box and substantially parallel to said bottom wall formed by removing contiguous portions of said bottom wall and side wall means, a cylindrical tubular metal sleeve having a length greater than the length of said recess and symmetrically disposed diametrically of said box in said recess with the ends of said sleeve extending beyond said side wall means, means fixedly securing said sleeve in said recess to substantially completely close the bottom wall of said metal box to prevent communication between said box and said sleeve, said sleeve having a smooth cylindrical interior to be received on any said cable, pipe, rod or like support, a threaded aperture in said tubular sleeve, screw means threadably received in said aperture in said sleeve to bear against any said support and to be tightened thereagainst to support said movable outlet box in any selected position along the length of said support and in any direction around the periphery of said support, said box having an open face adapted to receive an electrical outlet, and said sidewall means having at least one knockout for providing access by electrical conductors to the interior of said metal outlet box and to said electrical outlet.

References Cited in the file of this patent

UNITED STATES PATENTS

| D. 47,986 | Bissell | Oct. 19, 1915 |
| 1,721,724 | Appleton | July 23, 1929 |
| 2,587,423 | Young | Feb. 26, 1952 |
| 2,914,601 | Fuss | Nov. 24, 1959 |
| 2,930,564 | Maier | Mar. 29, 1960 |

FOREIGN PATENTS

| 593,437 | Canada | Mar. 1, 1960 |